US009663700B2

(12) United States Patent
Morris et al.

(10) Patent No.: US 9,663,700 B2
(45) Date of Patent: *May 30, 2017

(54) METHODS OF TREATING A WELL WITH A FLUORINATED LUBRICANT OR CORROSION INHIBITOR

(71) Applicant: HALLIBURTON ENERGY SERVICES, INC., Houston, TX (US)

(72) Inventors: Kay A. Morris, Houston, TX (US); Jay P. Deville, Houston, TX (US); Greg P. Perez, Pearland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 85 days.

This patent is subject to a terminal disclaimer.

(21) Appl. No.: 13/869,158

(22) Filed: Apr. 24, 2013

(65) Prior Publication Data
US 2014/0323359 A1  Oct. 30, 2014

(51) Int. Cl.
C09K 8/035 (2006.01)
C09K 8/03 (2006.01)

(52) U.S. Cl.
CPC ............ C09K 8/03 (2013.01); C09K 2208/34 (2013.01)

(58) Field of Classification Search
CPC ... C09K 8/52; C09K 8/68; C09K 8/80; C09K 2208/30; C09K 3/00; C09K 3/30; C09K 5/045; C09K 5/048; C09K 8/12; C09K 8/206; C09K 8/36; C09K 8/426; C09K 8/601; C09K 8/70; C09K 8/882; C09K 8/885; C09K 8/35; E21B 34/06; E21B 37/00; E21B 37/02; E21B 3/04; E21B 41/0007; E21B 41/0035; E21B 41/0085; E21B 43/006; E21B 43/10; E21B 43/11; E21B 43/114; E21B 43/119; E21B 43/128; E21B 43/162; E21B 43/01; E21B 21/00; E21B 23/01; E21B 29/08; E21B 33/035; E21B 33/1208; E21B 34/066; E21B 34/10; E21B 34/16; E21B 41/00; E21B 43/04; E21B 43/122; E21B 43/24; E21B 43/267; E21B 47/06; E21B 7/00
See application file for complete search history.

(56) References Cited

U.S. PATENT DOCUMENTS

| 5,874,169 | A * | 2/1999 | Falcone | C08G 65/007 427/131 |
| 6,114,448 | A * | 9/2000 | Derbes | C08L 27/18 428/421 |
| 6,770,601 | B1 * | 8/2004 | Brookey | C09K 8/206 166/309 |
| 7,595,281 | B2 | 9/2009 | McDaniel et al. | |
| 7,858,564 | B2 * | 12/2010 | Pasquier | C09K 8/34 166/305.1 |
| 2003/0232726 | A1 * | 12/2003 | Fisk, Jr. | C09K 8/22 507/100 |
| 2010/0152067 | A1 | 6/2010 | Mcdonald | |
| 2010/0204067 | A1 * | 8/2010 | Hoskins | C10M 143/00 507/138 |
| 2011/0177981 | A1 | 7/2011 | Sunkara | |
| 2012/0135897 | A1 * | 5/2012 | Dlugolecki | C10M 129/40 508/122 |
| 2012/0157353 | A1 | 6/2012 | Breeden | |
| 2012/0172262 | A1 | 7/2012 | Norman et al. | |

FOREIGN PATENT DOCUMENTS

CA    2686386 A1    11/2008

OTHER PUBLICATIONS

Solvay Technical Data sheet downloaded on Jan. 30, 2015.*
Disclosed Anonymously, Methods and Compositions for Drilling in Subterranean Formations Using Lubricant Beads Comprising Polytetrafluoroethylene (PTFE), IP.Com, Jan. 3, 2008, IPCOM000165754D.
Disclosed Anonymously, Drilling Fluids Using PTFE Powder As a Lubricating Agent and Methods of Drilling in Subterranean Formations, IP.Com, Jan. 15, 2007, IPCOM000145399D.
Canadian Intellectual Property Office, Examiner's Letter, Canadian Application No. 2907875, Oct. 12, 2016.
Australian Government IP Australia, Patent Examination Report No. 1, Australian Application No. 2014257516, Dec. 16, 2015.

* cited by examiner

Primary Examiner — Kumar R Bhushan
(74) Attorney, Agent, or Firm — McGuireWoods LLP

(57) ABSTRACT

A treatment fluid comprises: a base fluid; and at least one additive, wherein the additive: (i) comprises a fluorinated compound; and (ii) is a lubricant that is surface active. The additive can reduce the coefficient of friction between two or more surfaces. The surfaces can be the surface of a wellbore component. The additive can also be a corrosion inhibitor. A method of treating a portion of a well comprises: forming the treatment fluid; and introducing the treatment fluid into the well.

17 Claims, No Drawings

METHODS OF TREATING A WELL WITH A FLUORINATED LUBRICANT OR CORROSION INHIBITOR

TECHNICAL FIELD

An additive and methods of use are provided. The additive includes a fluorinated compound and is included in a well treatment fluid. The additive can be a lubricant. The additive can also be a corrosion inhibitor. The methods can include introducing the treatment fluid into a well.

SUMMARY

According to an embodiment, a method of treating a portion of a well comprises: introducing a treatment fluid into the well, wherein the treatment fluid comprises: a base fluid; and an additive, wherein the additive: (i) comprises a fluorinated compound; and (ii) is a lubricant that is surface active.

According to another embodiment, a method of treating a portion of a well comprises: introducing a treatment fluid into the well, wherein the treatment fluid comprises: a base fluid; and an additive, wherein the additive: (i) comprises a fluorinated compound; and (ii) is a lubricant that reduces the coefficient of friction between two or more surfaces.

According to another embodiment, a treatment fluid comprises: a base fluid; and at least one additive, wherein the additive: (i) comprises a fluorinated compound; and (ii) is a lubricant that is surface active.

DETAILED DESCRIPTION OF THE INVENTION

As used herein, the words "comprise," "have," "include," and all grammatical variations thereof are each intended to have an open, non-limiting meaning that does not exclude additional elements or steps.

It should be understood that, as used herein, "first," "second," and "third," are assigned arbitrarily and are merely intended to differentiate between two or more fluids, etc., as the case may be, and does not indicate any sequence. Furthermore, it is to be understood that the mere use of the word "first" does not require that there be any "second," and the mere use of the word "second" does not require that there be any "third," etc.

As used herein, a "fluid" is a substance having an external phase that tends to flow and to conform to the outline of its container when the substance is tested at a temperature of 71° F. (22° C.) and a pressure of one atmosphere "atm" (0.1 megapascals "MPa"). A fluid can be a liquid or gas. Some fluids have only one phase or more than one distinct phase. A solution is an example of a fluid having only one phase, containing a solvent (e.g., water) and a solute. A colloid is an example of a fluid having more than one distinct phase. A colloid can be: a slurry, which includes an external liquid phase and undissolved solid particles as the internal phase; an emulsion, which includes an external liquid phase and at least one internal phase of immiscible liquid droplets; a foam, which includes an external liquid phase and a gas as the internal phase; or a mist, which includes an external gas phase and liquid droplets as the internal phase. There can be more than one internal phase of a colloid, but only one external phase. For example, there can be an external phase, which is adjacent to a first internal phase, and the first internal phase can be adjacent to a second internal phase. Any of the phases of a colloid can contain dissolved materials and/or undissolved solids. An emulsion generally contains an aqueous liquid as the external phase; whereas, an invert emulsion generally contains a liquid hydrocarbon as the external phase.

As used herein, the term "water based" means a fluid having an external phase comprising an aqueous liquid or a solution comprising an aqueous liquid as the solvent. As used herein, the term "oil based" means a fluid having an external phase comprising a hydrocarbon liquid or a solution comprising a hydrocarbon liquid as the solvent.

It is to be understood that as used herein, the term "metal" is meant to include pure metals and metal alloys without the need to continually specify that the metal can also be a metal alloy. Moreover, the use of the phrase "metal or metal alloy" in one sentence or paragraph does not mean that the mere use of the word "metal" in another sentence or paragraph is meant to exclude a metal alloy. As used herein, the term "metal alloy" means a mixture of two or more elements, wherein at least one of the elements is a metal. The other element(s) can be a non-metal or a different metal. An example of a metal and non-metal alloy is steel, comprising the metal element iron and the non-metal element carbon. An example of a metal and metal alloy is bronze, comprising the metallic elements copper and tin.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

A well can include, without limitation, an oil, gas or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore, which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During wellbore operations, it is common to introduce a treatment fluid into the well. Examples of common treatment fluids include, but are not limited to, drilling fluids, spacer fluids, completion fluids, work-over fluids, production enhancement fluids, such as fracturing and acidizing fluids, and packer fluids. As used herein, a "treatment fluid" is a fluid designed and prepared to resolve a specific condition of a well or subterranean formation, such as for stimulation, isolation, gravel packing, or control of gas or water coning. The term "treatment fluid" refers to the specific composition of the fluid as it is being introduced into a well. The word "treatment" in the term "treatment fluid" does not necessarily imply any particular action by the fluid.

It is common to add one or more additives to a treatment fluid. Common additives used in treatment fluids include, but are not limited to, lubricants and corrosion inhibitors.

A lubricant is often used to protect the surfaces of two or more components from becoming adversely affected during operations. Lubricants can be used for decreasing torque (rotary friction) and drag (axial friction) in a wellbore and to lubricate metal bearings, for example in a drill bit, if not sealed. By way of example, the surface of one component (e.g., a metal component or the wall of a wellbore) that moves relative to another component can create friction during the movement. The friction can wear away part of one or both components. Therefore, a lubricant can be used to help reduce the amount of friction that occurs between two components. The lubricant can be a liquid or a solid. The liquid or solid lubricant can be positioned between the two components as an intermediate compound, such that the lubricant protects the components and decreases the friction between the components. Another benefit to using a lubricant during drilling operations, is that a greater rate of penetration into the subterranean formation can be achieved. Lubricants are also often used in extended reach drilling which is directional drilling of very long horizontal wellbores.

A lubricant can also function as a corrosion inhibitor. Many components of a well system are made from metals or metal alloys. These components are susceptible to corrosion. Corrosion is the wearing away of metals due to a chemical reaction. Corrosion can occur in a variety of ways, for example, when the metal is exposed to oxygen in the surrounding environment or when the metal is in contact with a fluid having a low enough pH, for example a pH in the acidic range. Corrosion inhibitors can work by adsorbing themselves on the metal surface, protecting the metal surface by forming a film. Inhibitors can be distributed from a solution or dispersion. Some are included in a protective coating formulation as a lubricant. For example, a corrosion inhibitor can be added to an acid wash and can function by adsorbing on a metal surface to form a protective film. The protective film decreases the destructive reaction of the acid with the metal. Generally, a corrosion inhibitor does not completely stop the corrosion reaction, but it can eliminate more than 99% of the metal losses that would occur if the inhibitor were not present.

The wearing away of metal well components via friction or corrosion can be quite detrimental to oil or gas operations. It has been discovered that an additive comprising a fluorinated compound can be used as a lubricant and/or a corrosion inhibitor. The fluorinated compound can be surface active. As used herein, the term "surface active" means that the compound reaches one or more surfaces and demonstrates lubricating properties. By way of example, a fluorinated compound can reach the surface of a wellbore component due to the oil- and water-repellant nature of the compound. The fluorinated compound does not easily dissolve or become miscible in an oil- or water-based fluid, thereby allowing the fluorinated compound to readily seek out the surface. Therefore, the additive can be used in water- or oil-based treatment fluids. Moreover, the fluorinated additive can have a low friction coefficient to solid materials, thus making it useful as a lubricant or corrosion inhibitor.

A fluorinated compound is a compound in which some or all of the hydrogen atoms are replaced with a fluorine atom. The number of hydrogen atoms that are replaced with a fluorine atom can be referred to as the degree of fluorination. A compound can have a low, medium, or high degree of fluorination. The degree of fluorination can have an impact on some of the physical characteristics of the compound, such as the compound's temperature stability. A compound wherein all hydrogen atoms are replaced with fluorine atoms is called a "perfluoro" or a "perfluorinated" compound.

A fluorinated compound can be a polymer. A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various ways along the polymer chain. For example, the repeating units can be random, alternating, periodic, or block. The conditions of the polymerization reaction can be adjusted to help control the average number of repeating units (the average chain length) of the polymer. As used herein, a "polymer" can include a cross-linked polymer. As used herein, a "cross link" or "cross linking" is a connection between two polymer molecules. A cross-link between two polymer molecules can be formed by a direct interaction between the polymer molecules, or conventionally, by using a cross-linking agent that reacts with the polymer molecules to link the polymer molecules.

A polymer has an average molecular weight, which is directly related to the average chain length of the polymer. The average molecular weight of a polymer has an impact on some of the physical characteristics of a polymer, for example, its solubility and its dispersibility. For a copolymer, each of the monomers will be repeated a certain number of times (number of repeating units). The average molecular weight for a copolymer can be expressed as follows:

$$\text{Avg. molecular weight} = (M.W.m_1 * RUm_1) + (M.W.m_2 * RUm_2)$$

where $M.W.m_1$ is the molecular weight of the first monomer; $RU\ m_1$ is the number of repeating units of the first monomer; $M.W.m_2$ is the molecular weight of the second monomer; and $RU\ m_2$ is the number of repeating units of the second monomer. Of course, a terpolymer would include three monomers, a tetra polymer would include four monomers, and so on.

A fluorinated compound can also be a surfactant. A surfactant is an amphiphilic molecule, comprising a hydrophobic tail group and a hydrophilic head group. The hydrophilic head can be charged. A cationic surfactant includes a positively-charged head. An anionic surfactant includes a negatively-charged head. A zwitterionic surfactant includes both a positively- and negatively-charged head. A surfactant with no charge is called a non-ionic surfactant.

Some of the problems associated with other lubricant or corrosion inhibitor additives commonly used in treatment fluids include a low thermal stability, solubility or miscibility in the base fluid, the need to include other additives to obtain functionality, and hazardous properties such as flammability or low flash point. Thus, there is a need for improved treatment fluid additives that can be used as a lubricant or corrosion inhibitor that function effectively at a variety of temperatures and have desirable properties. Some of the advantages of the novel additive comprising a fluorinated compound include a high specific gravity, thermal stability, non-flammable, no flash point or fire point, improved lubricity, and low friction coefficients.

According to an embodiment, a method of treating a portion of a well comprises: introducing a treatment fluid into the well, wherein the treatment fluid comprises: a base fluid; and an additive, wherein the additive: (i) comprises a fluorinated compound; and (ii) is a lubricant that is surface active.

According to another embodiment, a treatment fluid comprises: a base fluid; and at least one additive, wherein the additive: (i) comprises a fluorinated compound; and (ii) is a lubricant that is surface active.

According to another embodiment, a method of treating a portion of a well comprises: introducing a treatment fluid into the well, wherein the treatment fluid comprises: a base fluid; and an additive, wherein the additive: (i) comprises a fluorinated compound; and (ii) is a lubricant that reduces the coefficient of friction between two or more surfaces.

It is to be understood that the discussion of preferred embodiments regarding the treatment fluid or any ingredient in the treatment fluid, is intended to apply to the composition embodiments and the method embodiments.

The treatment fluid can be, without limitation, a drilling fluid, spacer fluid, completion fluid, work-over fluid, production enhancement fluid (e.g., fracturing and acidizing, perforating fluid), packer fluid, logging fluid, or a cementitious composition.

Preferably, the treatment fluid is a colloid, for example, a slurry, an emulsion, an invert emulsion, or a foam. The treatment fluid comprises a base fluid. The base fluid can be the external phase of the colloid. The base fluid can be selected from the group consisting of an aqueous liquid, a hydrocarbon liquid, or combinations thereof. Preferably, the base fluid consists essentially of the aqueous liquid or the hydrocarbon liquid. The additive can be a liquid or a solid. For a solid additive, preferably the additive has a cross-sectional size in the range of about 60 to about 0.1 micrometers. For a colloid: the additive can be at least one of the internal phases of the colloid. By way of example, if the treatment fluid is a foam, then the external phase of the foam can be the base fluid, the additive can be a liquid first internal phase, and a gas can be a second internal phase of the foam. By way of yet another example, the treatment fluid can be a slurry wherein the base fluid is the external phase, the additive can be a solid first internal phase, and a liquid can be a second internal phase of the slurry. It is to be understood, that any of the phases of the colloid can include dissolved or undissolved materials.

The aqueous liquid for the base fluid comprises water. The water can be selected from the group consisting of freshwater, brackish water, saltwater, and any combination thereof. The aqueous base fluid can further include a water-soluble salt. Preferably, the salt is selected from the group consisting of sodium chloride, calcium chloride, calcium bromide, potassium chloride, potassium bromide, magnesium chloride, and any combination thereof.

The hydrocarbon liquid for the base fluid can be selected from the group consisting of: crude oil; a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. The saturated hydrocarbon can be an alkane or paraffin. The paraffin can be an isoalkane (isoparaffin), a linear alkane (paraffin), or a cyclic alkane (cycloparaffin). The unsaturated hydrocarbon can be an alkene, alkyne, or aromatic. The alkene can be an isoalkene, linear alkene, or cyclic alkene. The linear alkene can be a linear alpha olefin or an internal olefin.

The additive can be immiscible in the base fluid. By way of example, due to the oil- and water-repellant nature of the fluorinated compound additive, the additive can be immiscible in an oil-based or water-based treatment fluid. As used herein, the term "immiscible" means that a non-homogenous fluid is formed. For example, a non-homogenous emulsion or invert emulsion can have creaming, flocculation or coalescing of the additive in the base fluid. It is to be understood that some homogeneity of the additive in the treatment fluid can exist, but the majority of the additive is immiscible in the base fluid and will thus more readily seek out and interact with a surface of a component instead of being fully incorporated into the base fluid.

The treatment fluid comprises the additive. The additive comprises a fluorinated compound. According to another embodiment, the additive consists essentially of the fluorinated compound. According to yet another embodiment, the additive is a fluorinated compound (i.e., consists of the fluorinated compound). The additive comprises carbon and at least one fluorine functional group. The additive can be an alkane (having single bonds between the carbon atoms) or an alkene (having double bonds between the carbon atoms). The additive can also comprise two or more fluorine functional groups. The additive can contain only carbon and fluorine atoms. Preferably, the additive is a perfluorinated compound. A perfluorinated compound can also contain other atoms in addition to carbon and fluorine, but will not contain any hydrogen atoms. According to another embodiment, the additive also includes other atoms in addition to carbon and fluorine atoms. For example, the additive can further comprise hydrogen, oxygen, or other atoms. The degree of fluorination (i.e., the number of hydrogen atoms replaced with a fluorine atom) can vary. The degree of fluorination can be selected based on the desired physical properties of the additive such as thermal stability and surface activity. By way of example, the degree of fluorination may have an impact on the thermal stability of the additive—the higher the degree of fluorination, the greater thermal stability. According to an embodiment, the additive has a degree of fluorination such that the additive is thermally stable. According to another embodiment, the additive has a thermal stability of at least 400° F. (200° C.), preferably of at least 600° F. (316° C.). As used herein, the term "thermal stability" means that the compound exhibits little to no molecular decomposition at higher temperatures (i.e., temperatures over 300° F. (149° C.)).

The additive can be a fluoropolymer. The fluoropolymer can be a homopolymer or a copolymer. The monomer residue(s) used to form the fluoropolymer can be selected from the group consisting of ethylene, propylene, vinyl fluoride, vinylidene fluoride, tetrafluoroethylene (TFE), hexafluoropropylene (HFP), perfluoropropylvinylether (PPVE), perfluoromethylvinylether (PMVE), perfluoropolyvinylethers (PFPE), fluoropropylene oxide, fluoromethylene oxide, fluoroethylene oxide, chlorotrifluoroethylene (CTFE), polytetrafluoroethylene (PTFE), polyhexafluorooxetane, and any combination thereof. The fluoropolymer can also contain other monomer residues not specifically listed above.

The additive can be selected from the group consisting of perfluoropolystyrene, perfluoropolytert-butylstyrene, perfluoropolymethylstyrene acrylates, polytetrafluoroethylene (PTFE), perfluorinated polystyrene, perfluoropolyalkylethyl acrylates, perfluoropolyalkylethyl methacrylates, perfluoropolyalkyl acrylates, perfluorinated polyamides, fluorinated polyamides, perfluoropolyacrylamides, PTFE-polyamides, perfluorinated tall oil fatty amides, fluorinated polysaccharides, perfluorinated fatty acids, perfluorinated tall oil fatty acids, perfluoropolystyrenebutadienes, perfluoropolyethylene ethene/butene copolymer, PTFE fibers, fluorinated fibers, fluorinated telomers, fluorinated telomer alcohols, fluorinated elastomers, tetrafluoropropanol, octafluoropentanol, dodecafluoroheptanol, derivatives of any of the foregoing, and combinations thereof. Preferably, the additive is selected from the group consisting of perfluoropolystyrene, perfluoropolytert-butylstyrene, perfluoropolymethylstyrene acrylates, perfluoropolyvinylethers (PFPE), polytetrafluoroethylene (PTFE), perfluorinated polystyrene, PTFE fibers, fluorinated fibers, fluorinated telomers, fluorinated telomer alcohols, tetrafluoropropanol, octafluoropentanol, dodecafluoroheptanol, and combinations thereof.

The additive is a lubricant. The additive can provide a coefficient of static friction less than 0.38, preferably less than 0.1 between the additive and a piece of steel. According to an embodiment, the additive reduces or eliminates the torque (rotary friction) and drag (axial friction) between two or more components. Preferably, the additive reduces the static friction coefficient between two components of the well by at least 20%, more preferably at least 40%, most preferably at least 60% when the additive is located between the two components. By way of example, the additive can reduce the static friction coefficient between two pieces of steel by at least 20% when the additive is placed between the two pieces of steel. That is, without the additive lubricant, the two pieces of steel could have a coefficient of static friction of 0.80, whereas with the additive placed between the pieces, the coefficient of static friction between the steel and steel could be 0.15. The components can be any components found in a well system. For example, the components can be components of a drill bit, a tool and a tubing string, two or more tubing strings, or the wall of a wellbore and a tool or wellbore equipment. The components can be a metal and another metal or a metal and a non-metal.

The additive is surface active. According to an embodiment, the additive reduces the coefficient of friction between two or more surfaces. The two or more surfaces can be any wellbore component as discussed above. The treatment fluid can be introduced into the well such that the additive fully or partially coats one or more of the surfaces of the components. The additive can be located between two or more of the surfaces of the components. Thus, the additive can protect the components from wearing away due to torque or drag frictions, among other things. According to another embodiment, the additive is a fluoro-surfactant. The fluoro-surfactant additive can be cationic, anionic, non-ionic, or zwitterionic.

The additive can also reduce or eliminate corrosion losses to any metal wellbore components. Therefore, the additive can also be a corrosion inhibitor. Preferably, the additive reduces the corrosion rate of a metal component by at least 40%, more preferably at least 60%, most preferably at least 80% at the bottomhole conditions of the well. According to an embodiment, the additive forms a film on one or more of the metal wellbore components.

The concentration of the additive in the treatment fluid can vary. According to an embodiment, the concentration of the additive is selected such that the additive functions for the intended purpose. By way of example, the functionality of a corrosion inhibitor is generally measured by the amount of corrosion loss to a metal or metal alloy in units of mils per year (mpy). A corrosion inhibitor that yields a corrosion loss of less than or equal to 50 mpy at a specific temperature and pressure is considered to function effectively as a corrosion inhibitor. According to this example, the additive can be in at least a sufficient concentration such that the treatment fluid yields a corrosion loss to a metal wellbore component of less than or equal to 50 mpy at the bottomhole temperature and pressure of the well. The concentration of the additive can be in at least a sufficient concentration such that the static coefficient of friction between the wellbore components located in the well where the treatment fluid is introduced, is reduced by at least 20%, preferably at least 40%, more preferably at least 60%.

The treatment fluid can also contain one or more additional additives. Examples of additional additives include a fluid loss additive, lost-circulation material, viscosifier or suspending agent, sweeping agent, emulsifier, oxygen scavenger, a pH buffer, a weighting agent, an acid, proppant, an alkalinity source, a shale stabilizer, a biocide, a scavenger, a thinner, a flocculent, a deflocculent, a bridging agent, a breaker, and a dispersant. The additional additive can also be a fluorinated or perfluorinated compound. The exact additional additives that can be included depend on the type of treatment fluid being introduced into the well. For example, a drilling fluid might further include a weighting agent, an acidizing fluid might further include an acid, and a fracturing fluid might further include proppant.

The methods include the step of introducing the treatment fluid into the well. The step of introducing can comprise pumping the treatment fluid into the well. The well can be, without limitation, an oil, gas, or water production well, an injection well, or a geothermal well. According to an embodiment, the well has a bottomhole temperature in the range of about 100° F. to about 650° F. (about 38° C. to about 343° C.). Due to the thermal stability of the additive, preferably the additive is used in a high-temperature well, wherein the high-temperature well has a bottomhole temperature greater than 300° F. (149° C.).

The additive can be included in the treatment fluid directly to the base fluid. The additive can also be encapsulated (similar to a liquid gel capsule), wherein the encapsulated additive is added to the treatment fluid. The material making up the capsule can be selected such that the capsule dissolves or melts at a desired time thereby releasing the additive into the base fluid of the treatment fluid at a desired time. Preferably, the desired time is the time necessary for the encapsulated additive to reach the desired portion of the well. This embodiment may be useful for any oil or gas operation, but especially for extended reach drilling. The additive can then function as a lubricant and/or a corrosion inhibitor. The step of introducing can include introducing the treatment fluid into an annulus. According to an embodiment, the well penetrates a reservoir or is located adjacent to a reservoir.

The methods can further include the step of forming the treatment fluid prior to the step of introducing. The treatment fluid can be formed ahead of use or on the fly. The methods can further include the step of introducing a second, third, and so on treatment fluid into the well. The methods can further include the step of removing at least a portion of the treatment fluid after the step of introducing.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b,") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating a portion of a well comprising:
   introducing a treatment fluid into the well, wherein the treatment fluid comprises:
   a base fluid, wherein the base fluid is selected from the group consisting of an aqueous liquid, a hydrocarbon liquid, and a liquid fluorinated compound; and
   a liquid additive, wherein the additive has a thermal stability of at least 600° F. and wherein the additive:
   (i) comprises perfluoropolystyrene; and
   (ii) is a lubricant that is surface active; and
   wherein the treatment fluid is a colloid, wherein the base fluid is the external phase of the colloid.

2. The method according to claim 1, wherein the treatment fluid is a drilling fluid, spacer fluid, completion fluid, workover fluid, production enhancement fluid, packer fluid, logging fluid, or a cement composition.

3. The method according to claim 1, wherein the aqueous liquid comprises water, and wherein the water is selected from the group consisting of freshwater, brackish water, saltwater, and any combination thereof.

4. The method according to claim 1, wherein the hydrocarbon liquid is selected from the group consisting of: crude oil; a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof.

5. The method according to claim 1, wherein the additive is immiscible in the base fluid.

6. The method according to claim 1, wherein the additive further comprises an additional perfluorinated compound.

7. The method according to claim 1, wherein the additive further comprises an additional fluoro-surfactant.

8. The method according to claim 1, wherein the additive further comprises an additional fluoropolymer.

9. The method according to claim 1, wherein the additive further comprises a fluorinated compound selected from the group consisting of perfluoropolytertbutyl styrene, perfluoropolymethylstyrene acrylates, perfluoropolyvinylethers (PFPE), polytetrafluoroethylene (PTFE), perfluorinated polystyrene, PTFE fibers, fluorinated fibers, fluorinated telomers, fluorinated telomer alcohols, tetrafluoropropanol, octafluoropentanol, dodecafluoroheptanol, and combinations thereof.

10. The method according to claim 1, wherein the additive provides a coefficient of static friction less than 0.38 between the additive and a piece of steel.

11. The method according to claim 1, wherein the additive reduces or eliminates the torque and drag between two or more components, wherein the components are part of the well.

12. The method according to claim 11, wherein the additive reduces the static friction coefficient between two components of the well by at least 20% when the additive is located between the two components.

13. The method according to claim 1, wherein the treatment fluid is introduced into the well such that the additive fully or partially coats one or more solid surface of a component, wherein the component is part of the well.

14. The method according to claim 1, wherein the additive is a corrosion inhibitor.

15. The method according to claim 1, wherein the additive reduces the corrosion rate of a metal component of the well by at least 40% at the bottomhole conditions of the well.

16. The method according to claim 1, wherein the well has a bottomhole temperature in the range of about 100° F. to about 650° F.

17. A method of treating a portion of a well comprising introducing a treatment fluid into the well, wherein the treatment fluid comprises:
    a base fluid, wherein the base fluid is selected from the group consisting of an aqueous liquid, a hydrocarbon liquid, or a liquid fluorinated compound; and
    liquid additive, wherein the additive has a thermal stability of at least 600° F.; and wherein the additive:
      (i) comprises perfluoropolystyrene; and
      (ii) is a lubricant that reduces the coefficient of friction between two or more surfaces; and
    wherein the treatment fluid is a colloid, wherein the base fluid is the external phase of the colloid.

* * * * *